Figure 1:
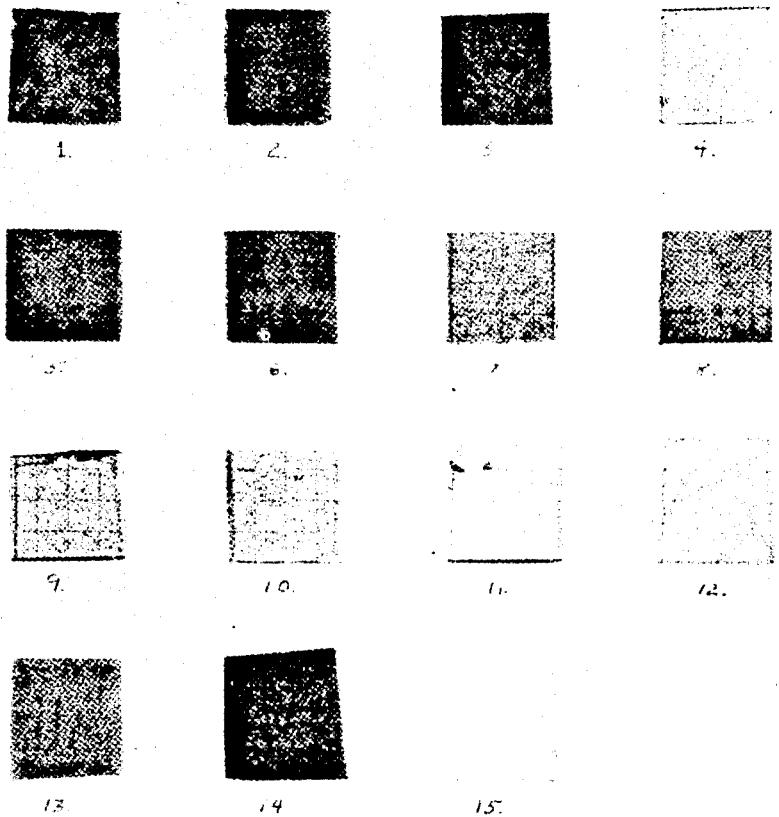

June 19, 1956   W. S. BARNHART ET AL   2,751,376
PURIFICATION PROCESS FOR FLUORINE CONTAINING POLYMERS
Filed March 10, 1953   2 Sheets-Sheet 1

VISUAL TEST OF PURIFICATION EFFICIENCY

INVENTORS
WILLIAM S. BARNHART
RUSSELL M. MANTELL
BY G. H. Palmer
Cruzan Alexander
ATTORNEYS

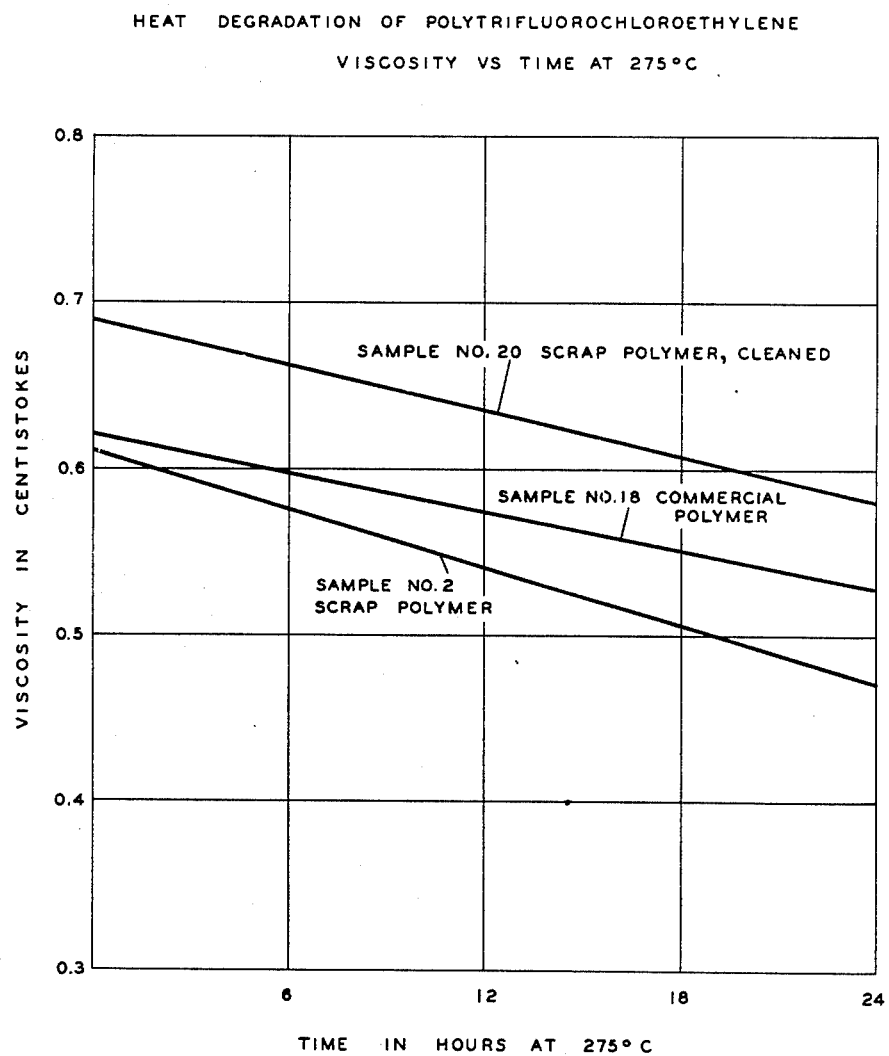

United States Patent Office 2,751,376
Patented June 19, 1956

2,751,376

PURIFICATION PROCESS FOR FLUORINE CONTAINING POLYMERS

William S. Barnhart, Cranford, and Russell M. Mantell, Orange, N. J., assignors to The M. W. Kellogg Company, Jersey City, N. J., a corporation of Delaware Application March 10, 1953, Serial No. 341,564

20 Claims. (Cl. 260—92.1)

This invention relates to a process for purifying and reclaiming contaminated materials. In one of its aspects, this invention relates to the purification and reclamation of contaminated polymers and in one of its more particular aspects to the reclamation of halogenated polymers.

The loss of valuable materials due to contamination has always been a serious industrial problem. Because conventional processes for the purification and recovery of many materials are either not applicable or must be modified to such an extent as to become too costly, the materials have been discarded. For example, when the contaminated material is a solid polymer, such as solid halocarbon polymers, the problem becomes more apparent. The monetary loss due to contamination of these polymers is appreciable.

Polymers become contaminated during various production and fabrication processes to which they are subjected. For example, in the bomb or mass-bulk type of polymerization process, wherein a solid polymer is produced, the polymer adjacent to the bomb wall becomes contaminated with the metallic components of the wall, reaction products derived from these components, such as metal salts, and other inorganic materials. These contaminated portions are usually cut from the inner non-contaminated portion of the polymer and discarded. In preparing solid polymers for shipment, bits of cloth, paper, wood, etc., may become embedded or admixed with the polymer. In molding operations excess or "flash" material is cut from the molded article and collected in a scrap container where it may become contaminated with dust, dirt, oil, grease and other organic and inorganic contaminants. In addition, fabricated materials, such as valve seats, gaskets, etc., may lose their utility due to surface accumulation of dirt, grease, etc. Attempts to mold, or otherwise use, contaminated polymers have in many instances been unsuccessful. When contaminated polymers are heated, during molding operations for example, the impurities present cause a decrease in the molecular weight of the polymer, as will become evident hereinafter. In addition, marked discoloration is evident, bubbles are formed and suspended particles can be seen within the molded polymer. It is, therefore, obvious that the need for a process to purify and reclaim contaminated polymers is great; present processes for recovery are limited and when employed generally degrade the polymer.

It is an object of this invention to provide a process for removing contaminants present in a material without substantially degrading the material.

It is another object of this invention to provide a process which will make it possible to produce materials more economically by reclaiming and utilizing contaminated material.

It is still another object of this invention to provide a process by which materials of extremely high purity may be prepared.

It is a further object of this invention to purify and reclaim contaminated polymers.

It is still a further object of this invention to produce polymers of high molecular weight and superior heat stability by removing contaminants from the polymer by the process of this invention.

This invention has as one of its more particular objects, the purification and reclamation of halocarbon polymers such as polytrifluorochloroethylene.

Various other objects of the present invention will become apparent to those skilled in the art from the accompanying description and disclosure.

This invention presents a novel, efficient and practical method for purifying and recovering contaminated materials. Since the process of this invention is readily adapted to the purification and recovery of polymeric materials, and since the economic need for such a process is greater in the polymer field, this invention will be described in terms of its use in the recovery of polymers, particularly polymers of trifluorochloroethylene. It is to be understood and will be clearly apparent to those skilled in the art that the process of this invention may be applied to a wide variety of materials subject only to those limitations as will become apparent herein.

Materials which are particularly suited to the process of this invention are those solid materials which are not substantially subject to oxidative attack, and which are preferably substantially insoluble in the acid-oxidizing reagent solution but not necessarily so. Obviously, any material which is readily oxidizable will be decomposed by the treatment proposed in this invention and, therefore, can not be recovered. Liquid materials, either miscible or immiscible in the acid-oxidizing reagent solution, for example those materials which are too high boiling for distillation or form azeotropes, may be treated and successfully recovered by the process of this invention. Illustrative of the types of polymeric materials which may be purified and reclaimed by the process of this invention are those solid homopolymers and copolymers produced from olefinic monomers containing fluorine, such as homopolymers of tetrafluoroethylene, trifluorochloroethylene, perfluoropropene, perfluorobutadiene, etc., and copolymers prepared by copolymerizing the above, preferably trifluorochloroethylene and/or tetrafluoroethylene with varying quantities of one or more of the following: ethylene, vinyl chloride, vinyl fluoride, vinylidene fluoride, vinylidene chloride, and trifluoroethylene.

According to this invention, an impurity present in a substance, such as a polymer, e. g. polytrifluorochloroethylene, is removed therefrom by the action of a carboxylic acid and an oxidizing reagent dissolved in a suitable vehicle or solvent.

The selection of an acid for use in this invention is of prime importance. Inorganic or mineral acids are not suited to the process for the purpose of purification. It has been discovered that a water soluble carboxylic acid having not less than 2 and not more than 10 carbon atoms in the molecule comprising the substituted and unsubstituted aromatic carboxylic acids wherein the substituent is a chlorine, fluorine, or phenyl group or groups, such as benzoic acid, chlorobenzoic acid, phenylacetic acid, phenylpropionic acid, toluic acid, and phthalic acid, etc. and the substituted and unsubstituted aliphatic carboxylic acids, wherein the substituent is a chlorine, fluorine, or alkyl group or groups, such as succinic acid, glutaric acid, adipic acid, trichloroacetic acid, mono, di, and trifluoroacetic acid, etc. and preferably the alkyl carboxylic acids having not more than 5 carbon atoms in the molecule, such as acetic acid, propionic acid, butyric acid and valeric acid, are particularly suitable for purification processes due to their wetting and penetrating power. A particularly suitable acid for the purification of polytrifluorochloroethylene is acetic acid. Acetic acid wets and penetrates this polymer whereas the mineral acids do not. The suitability of acetic acid, therefore, resides in its wetting and penetrating powers as well as in its ability to react with and dissolve some of the impurities present, such as by complexing with iron. Other acids in the class with acetic acid have also been discovered to possess this power to wet and penetrate and since the wetting ability of these acids will vary depending upon the material being purified, selection of the acid will be based on the nature of the material. As stated above, acetic acid is the preferred acid for purification and reclamation of polymers of chlorotrifluoroethylene.

Since contaminated scrap materials almost invariably contain some impurities which are not susceptible to removal by acids, which impurities comprise wood, dirt, cloth, paper, etc., acid alone will not purify the contaminated material. It has been further discovered that by dissolving and mixing a quantity of oxidizing reagent in a suitable vehicle, preferably in an alkyl monocarboxylic acid, impurities which are not susceptible to removal by the acid are either decomposed to volatile compounds or to non-volatile compounds which are soluble. Generally, strong inorganic metallic oxidizing reagents which comprise that class of inorganic compounds derived from heavy metals which can exist in several valance states and which when used as oxidizing reagents are in their highest valence state and are subsequently reduced, by the material oxidized, to a lower valence state. For example, chromium trioxide, also known as chromic anhydride ($CrO_3$), is reduced to chromous oxide ($CrO$). Illustrative of this class are chromium trioxide, sodium and potassium dichromate, manganese dioxide and potassium permanganate and the salts and oxides of cerium, vanadium and titanium, osmium, lead, in their highest valence state. Chromium trioxide is preferred. By admixing an oxidizing reagent with an alkyl monocarboxylic acid, the wetting and penetrating power of the acid more efficiently exposes the oxidizing reagent to the impurities present in the material.

Obviously, for the satisfactory operation of this invention, the contaminant of the material must be contacted by the acid-oxidizing reagent solution or mixture. Thus, where the surface of an object has become contaminated, for example a polytrifluorochloroethylene sheet whose surface is embedded with dust, grease, etc., or a piece of glassware covered with a film of grease and/or dirt, the acid-oxidizing reagent solution may be applied to the contaminated surface. While not mandatory, it is preferred that the material be in a finely divided state prior to treatment. If not already finely divided, the material may be ground by conventional grinding techniques. The extent of grinding will depend on several factors. On one hand excessive grinding, with its attendant heating of the material due to friction, may result in degradation of the material; on the other hand, if the material is not ground fine enough operational procedures may become excessively prolonged. It has been discovered that grinding the material between about 10 and about 150 mesh is usually adequate. The preferred range of fineness is between about 50 and about 120 mesh.

The temperature and pressure at which operations are conducted will be determined by the nature of the material being purified and by the nature and extent of contamination. Thus, where the material would be degraded at elevated temperatures, reduced temperatures may be employed. Operations at the selected lower temperature range may be effected by thermostatic control of the temperature or by operation at sufficiently reduced pressure so that the solution has, as its boiling point, the desired temperature. When necessary, that is, when the nature of the impurities requires an extremely high temperature, operations may be conducted at superatmospheric pressures and, therefore, at temperatures considerably above the boiling point of the solution at atmospheric pressure but obviously below the temperature at which recomposition of the material being purified would occur. Because of the ease with which the temperature may be controlled and because considerably less expensive equipment is required, it is preferred to conduct operations near the boiling point of the solution at atmospheric pressure. For example, when acetic acid, which has a boiling point at atmospheric presusre of about 120° C., is used, the operation is conducted near 120° C.

The contact time will vary in accordance with conditions of operation. The nature of the impurities present, the concentration of oxidizing reagent and the fineness to which the material has been ground must all be taken into account. In addition, the temperature at which operations are conducted will influence the required contact time. The lower the temperature employed, the longer will be the required contact time. A period of time between about 10 minutes and about 40 hours has been found to be adequate. Preferred time is between 1 and about 26 hours.

In the preferred operation of this invention, which for purposes of illustration is described in terms of the purification and reclamation of polytrifluorochloroethylene, the contaminants present in the polymer are contacted by mixing the finely divided polymer with an organic acid of the above type and an inorganic oxidizing reagent of the above type. The preferred acid for the purification of polytrifluorochloroethylene is acetic acid; the preferred oxidizing reagent is chromium trioxide.

The acid-oxidizing reagent solution comprises acetic acid and between about 0.0003 and about .03, preferably above 0.003 mole of chromium trioxide for each mole of acetic acid. Glacial acetic acid may be used. However, it has been discovered that the presence of between about 0.003 and about 0.03 mole of water per mole of acetic acid greatly enhances the oxidizing power of the chromium trioxide. It is preferred to mix the contaminated polymer with between about 1 and about 20, preferably about 5 times its weight of acid-oxidizing reagent solution. The resulting mixture is then maintained at a temperature between room temperature and its boiling point, preferably its boiling point, for between about 4 and about 24 hours, preferably between about 8 and about 12 hours. It is preferred, particularly when the material being purified is substantially insoluble, to agitate or stir the mixture. By stirring the mixture, "bumping" caused by local overheating is prevented, the time required is lessened and the amount of acid-oxidizing reagent solution needed can be decreased. Stirring may be effected by conventional techniques. The treated polymer is then recovered from the mixture by a convenient process, such as filtration, decantation, etc.; filtration is preferred.

Since the polymer recovered by filtration from the above described purification process may contain small amount of occluded, adhered or otherwise present contaminants from the acid-oxidizing reagent treatment, which contaminants comprise acetic acid, chromium trioxide, chromium derivatives and the non-volatile products of the treatment, etc., a subsequent purification step should be employed. This subsequent step comprises extraction of the contaminants with a solvent. Two illustrative types of extraction procedure are described herein. It will be apparent to those skilled in the art that these procedures may be modified or altered without departing from the scope of this invention. One type of extraction or washing procedure to which the filtered polymer may be subjected comprises washing with approximately 5 times its weight of acetic acid, which may contain between about 1 and about 10 per cent of hydrochloric acid, after which it is admixed with an additional quantity of acetic acid and the resulting admixture refluxed for about one hour. The refluxed admixture is then filtered and rewashed with acetic acid. The rewashed, filtered polymer is then washed with about 5 times its weight of an organic solvent, preferably a low boiling alcohol, such as methyl alcohol, after which it is admixed with an additional quantity of the solvent and refluxed for about 1 hour. The refluxed admixture is then filtered and the recovered purified polymer is dried to constant weight at elevated temperatures, preferably when the polymer is polytrifluorochloroethylene, at a temperature between about 120° C. and about 150° C.

Another type of extraction or washing procedure comprises repeatedly washing the polymer recovered from the acid-oxidizing reagent treatment by filtration, with hot methyl alcohol, preferably between about 50° C. and about 65° C., until tests for the presence of chromate ion in the wash liquid are negative.

A water washing step may be incorporated in either of the above described washing procedures as an initial step, for example prior to washing with acetic acid in the first described process. This water washing step comprises washing and boiling the polymer a plurality of times with water. This step would conserve the most valuable reagents used for washing in the above described processes. The recovered polymer is then dried at elevated temperatures as described above. Since any convenient washing or extraction procedure may be used, it is to be understood that the above illustrations are offered for information and are not unnecessarily limiting.

Generally, it is advisable to use concentrations of oxidizing reagent above 0.003 mole per mole of acetic acid as described above, since, at high concentrations, the efficiency of the system is much greater. However, due to the wetting and penetrating power of the alkyl monocarboxylic acids, the oxidizing agent becomes intimately dispersed within the particle of the material being purified. Since the preferred class of oxidizing reagents are colored and since the presence of color in the recovered material will, at times, be objectionable, this finely dispersed oxidizing agent may have to be removed from the purified material. However, when large amounts of oxidizing reagent are used, correspondingly greater quantities are dispersed in the material and the time required for removal becomes excessive. In addition, the techniques which must be employed become more complicated. It is, therefore, desirable, in some instances, to operate with lower concentrations of oxidizing reagent. A method has been discovered wherein very low concentrations of primary oxidizing reagent may be successfully employed, without substantially decreasing the efficiency of the process. According to this discovery, a secondary oxidizing reagent of sufficiently high oxidizing potential is added to the solution. This secondary oxidizing reagent serves to maintain the primary oxidizing reagent in its highest valence state. It is, therefore, possible to operate with a minimum quantity of primary oxidizing reagent since, as the primary oxidizing reagent is "spent" contact with the secondary oxidizing reagent oxidizes the "spent" reagent to its highest valence state. For example, when chromium trioxide is employed as the primary oxidizing reagent, it is reduced to chromous oxide. When a secondary oxidizing reagent of sufficiently high potential is incorporated in the solution, such as potassium chlorate, the chromous oxide is converted to chromium trioxide. Obviously this additional oxidizing reagent will also oxidize, to some extent, the impurities present in the material. However, the oxidation rate of these secondary oxidizing reagents is usually below that of the primary reagent so that, if the primary oxidizing reagent were not used, the time required to effect oxidation would be excessive. This phase of the invention resides in the use of secondary oxidizing reagent to maintain the primary oxidizing reagent in its most efficient form, that is, in its highest valence state. Any oxidizing reagent of sufficiently high potential, which will convert the spent primary reagents may be used, subject only to the obvious and practical limitation that it be substantially colorless. Preferred secondary reagents are the inorganic halo acids and their salts, such as the chloric, perchloric, bromic, iodic and periodic acids, and the sodium and potassium salts of these acids, and hydrogen peroxide. The preferred reagent is potassium chlorate. An example of the use of this method is given herein. This example is offered for purpose of illustration and is not to be construed as unnecessarily limiting the invention or as the only method which can be employed. 40 gms. of finely divided polytrifluorochloroethylene, was mixed with 200 gms. of acetic acid of 98% concentration (2% water) to which was added 0.1 gm. of chromium trioxide and 5 gms. of potassium chlorate. The resulting admixture was heated to boiling and gently refluxed for about 12 hours. The refluxed admixture was then filtered and washed as described herein and the recovered polymer was examined. This recovered polymer was substantially equivalent to the polymer recovered by the process which employs only a primary oxidizing reagent. However, the color of this recovered polymer was superior to that of the other polymer. Frequent inspection of the admixture during the reflux operation was made. The color of the solution was at all times substantially orange-red; the characteristic color of chromium ion in its highest valence state. At no time was the characteristic green color of the chromous-ion detected. In the preferred operation of the above described process wherein two oxidizing reagents are used, there is present for each mol of acetic acid, preferably, between about 0.0003 and about .001 mol of chromium trioxide and preferably between about .01 and .04 mol of potassium chlorate.

In order to more clearly demonstrate the present invention, Figures 1 and 2 of the drawings and a table have been included herein. The numbering of the samples in the table corresponds to the numbers employed in Figures 1 and 2 of the drawings so that cross referencing will be simplified. Sample numbers 18 and 20 do not appear in Figure 1 of the drawing. They are equivalent in appearance to sample number 15 which is shown. Figure 1 of the drawing portrays photographically the extent of purification obtained by the various processes employed as indicated by the degree of discoloration, presence of suspended particles, bubbles, etc. Figure 2 of the drawing presents, graphically, a comparison, based on viscosity measurements made during the heat degradation of the polymer under test, between contaminated polytrifluorochloroethylene (sample #2) and polytrifluorochloroethylene purified by the process of this invention (sample 20). A viscosity curve of a commercial grade of polytrifluorochloroethylene has been included in Figure 2 for purposes of reference (sample 18). The table lists viscosity and no strength temperature measurements of scrap polymer recovered by various purification processes including the process of this invention. Measurements of viscosity and no strength temperature reflect the molecular weight of the polymer. Thus, a high molecular weight polymer will have a higher viscosity and a higher no strength temperature than a polymer of lower molecular weight derived from the same monomer. The deleterious effects of impurities in the polymers as well as the efficiency of various purification processes can thus be seen by referring to the enclosed figures of the drawings and the table.

The data presented in Figures 1 and 2 of the drawings and the table were obtained by substantially equivalent experimental procedures. In general, 40 gms. of finely ground scrap polytrifluorochloroethylene, was admixed with approximately 200 ml. of the liquid reagent specified in the table. When the treatment used involved more than one step that fact is indicated, in the table, by separately numbering the steps. The admixture of ground polymer and liquid reagent was then heated to boiling and gently refluxed. The polymer was recovered from the mixture by filtration after which it was washed and dried as described above.

The recovered polymer was then cold-pressed in a 2" drain die at 10,000 pounds per square inch gauge and subsequently hot-pressed at 246° C. for one minute so as to produce a circular plaque 1/16" thick. The viscosity of this recovered material was then determined, and is reported in the table as in the column designated "After Purification." This figure denotes the viscosity in centistokes of the sample in 0.5% concentration in dichlorobenzotrifluoride. Similar data for the recovered material after 24 hours aging at 275° C. is given in the table in the column designated "After Purification and Heat Aging." The calculated no strength temperatures were obtained from the empirical correlation between viscosity and no strength temperature. In sample 20 the no strength temperatures in parentheses were obtained by actual measurement as a check on the calculated figure.

of the polymer over the simpler acetic acid treatment (sample 10).

The use of chromic acid in either dilute or concentrated sulfuric acid followed by acetic acid alone is relatively good but is inferior to chromic acid in acetic acid (samples 11 and 12). The use of hydrofluoric acid does not improve the color of the polymer (samples 13, 14, and 17). The use of chromic acid in acetic acid gives the best results. The pretreatment with aqueous alkali appears to be unnecessary (samples 15 and 20) in this instance; however such pretreatment may, at times, be necessary. The contaminated material may be subjected to any necessary pretreatment without departing from the scope of this invention. The time required to effect purification is illustrated by samples 16, 20, 22, 23, 25, and 26. In general, the shorter time periods effectively purify the polymer with respect to its physical characteristics but leave particles which impart an objec-

*Heat aging of polytrifluoro chloroethylene reclaimed by various purification processes*

| Sample No. | Method of Treatment | After Purification | | After Purification and Heat Aging | |
|---|---|---|---|---|---|
| | | Visc. | Calculated NST [1] | Visc. | Calculated NST [1] |
| 1 | Ground 40-100 mesh | .64 | 262 | .46 | Below 220. |
| 2 | Micropulverized, 100 mesh | .61 | 250 | .47 | Below 220. |
| 3 | (1) Acetic acid, 24 hours; (2) 190 ml. sulfuric acid, 10 ml. nitric acid, 4 hours. | .68 | 274 | .56 | 230. |
| 4 | (1) Acetic acid, 24 hours | .67 | 271 | .52 | 224. |
| 5 | (1) Acetic acid, 24 hours; (2) aqua regia, 24 hours | .56 | 230 | .43 | Below 220. |
| 6 | (1) Aqua regia, 24 hours | .60 | 246 | .44 | Below 220. |
| 7 | (1) Formic acid, 24 hours | .63 | 258 | .45 | Below 220. |
| 8 | (1) Formic acid, 24 hours; (2) acqua regia, 24 hours | .60 | 246 | .44 | Below 220. |
| 9 | (1) Hydrofluoric acid, 24 hours; (2) aqua regia, 24 hours; (3) acetic acid, 24 hours. | .63 | 258 | .47 | Below 220. |
| 10 | (1) 150 ml. acetic acid, 50 ml. acetyl chloride, 24 hours. | .64 | 262 | .51 | 223. |
| 11 | (1) 200 ml. sulphuric acid, concentrated, 2 gms. chromium trioxide, 4 hours; (2) acetic acid, 24 hours. | .63 | 258 | .51 | 223. |
| 12 | (1) 100 ml. concentrated sulfuric acid, 100 ml. water, 2 gms. chromium trioxide, 4 hours; (2) acetic acid, 24 hours. | .64 | 262 | .52 | 224. |
| 13 | (1) 190 ml. acetic acid, 10 ml. nitric acid, 4 hours; (2) hydrofluoric acid, 24 hours. | .69 | 276 | .48 | Below 220. |
| 14 | (1) 190 ml. acetic acid, 10 ml. hydrofluoric acid, 24 hours; (2) acetic acid, chromium trioxide, 2 gms., 2 hours. | .55 | 228 | .44 | Below 220. |
| 15 | (1) 10 gms. sodium hydroxide, 200 ml. water, 4 hours; (2) acetic acid, 2 gms. chromium trioxide, 2 hours. | .69 | 276 | .50 | 222. |
| 16 | (1) 200 ml. acetic acid, 2 gms. chromium trioxide, 2 hours. | .69 | 277 | .63 | 259. |
| 17 | (1) 175 ml. acetic acid, 25 ml. 48% hydrofluoric acid, 2 hours. | .68 | 274 | .52 | 224. |
| 18 | Commercial grade polymer of trifluorochloroethylene as a blank. | .62 | 254 | .53 | 224. |
| 19 | (1) Methyl alcohol, 2 hours | .63 | 259 | .50 | 223. |
| 20 | (1) 182 ml. acetic acid, 18 ml. water, 2 gms. chormium trioxide, 24 hours. | .70 | 280 (279) | .58 | 237 (236). |
| 21 | (1) 190 ml. acetic acid, 10 ml. water, 10 ml. nitric acid, 2 gms. chromium trioxide, 4 hours. | .68 | 274 | .63 | 259. |
| 22 | (1) 190 ml. acetic acid, 10 ml. water, 10 gms. chromium trioxide, 4 hours. | .70 | 279 | .62 | 255. |
| 23 | (1) 190 ml. acetic acid, 10 ml. water, 10 gms. chromium trioxide, 8 hours. | .68 | 274 | .58 | 236. |
| 24 [2] | (1) 190 ml. acetic acid, 10 ml. water, 10 gms. chromium trioxide, 8 hours. | .67 | 271 | .59 | 241. |
| 25 | (1) 190 ml. acetic acid, 10 ml. water, 10 gms. chromium trioxide, 24 hours. | .69 | 277 | .58 | 237. |
| 26 | (1) 190 ml. acetic acid, 10 ml. water, 10 gms. chromium trioxide, 48 hours. | .69 | 277 | .62 | 255. |

[1] No strength temperature.
[2] Washed by the second washing procedure described above.

From the table and Figures 1 and 2, of the drawing the following comments may be made. The more finely ground a polymer is, the more dispersed will be the impurities present within the polymer (samples 1 and 2). The use of concentrated sulfuric and nitric acids removes some of the organic matter, but darkens the color of the polymer (sample 3). Acetic acid removes soluble impurities, such as iron, from the polytrifluorochloroethylene, but leaves some of the organic matter undecomposed (sample 4). Aqua regia does not remove organic matter very effectively and actually darkens the color of the polymer (samples 5, 6, 8, and 9). Formic acid does not adequately remove soluble impurities, such as iron, from the polymer probably due to its poorer "wetting" ability for this material (samples 7 and 8). Acetyl chloride-acetic acid mixtures do not improve the color tionable appearance. Longer contact time improves the physical characteristics of the polymer and removes objectionable particles. The efficiency of the two washing procedures can be seen by referring to samples 23 and 24. The samples having the best color were: 4, 9, 10, 11, 12, and 15, and 20, 22, 23, 25, and 26 (not shown in Figure 1 of the drawing). The samples having the best initial viscosities: 3, 4, 13, 15, 16, 20, 22, 25, and 26. The samples having the best final viscosities: 3, 16, 20, 21, 22, 23, 24, 25, and 26. By the process of this invention the apparent N. S. T. of the polymer is raised from about 250 to 280 (samples 2 and 20). The heat degradation of the treated polymer (sample 20) over a 24 hour period at 275° C. matches that of a typical commercial "KEL-F" polymer (sample 18) of similar molecular weight within the limits of experimental error. (See graph 1.) "KEL-F" is the registered trade mark of the M. W. Kellogg Company for its fluorocarbon products.

Based on the above comments, the following conclusions are drawn. The mineral acids alone or in combination with an oxidizing reagent are not suitable for purification puropses. However, when used as a solvent for the oxidizing reagents in conjunction with one of the above described class of acids, such as acetic acid, relatively good results are obtained. In this latter instance, the mineral acids serve chiefly as a vehicle for the oxidizing reagent; the purification of the polymer being due to the action of the oxidizing reagent and the above described carboxylic acids. The use of the mineral acids as vehicles for oxidizing reagents is contemplated in this invention subject only to the limitation that one of the enumerated paraffinic or aromatic carboxylic acids be employed in addition thereto either prior or subsequent to the mineral acid treatment. Since the carboxylic acids are also vehicles for the oxidizing reagent, it is preferred to use the oxidizing reagent in combination with a carboxylic acid instead of using an additional reagent as a vehicle.

The above comments and conclusions, made with reference to the table and Figures 1 and 2 of the drawings, have been, for the sake of brevity, confined to those salient points which best illustrate the invention. Many other conclusions and variations in procedure may be observed by one skilled in the art, such as for example optimum concentrations of reagents, on examination of the table and figures of the drawings. It is, to be understood that these comments and conclusions have been offered for illustration and are not to be construed as unnecessarily limiting the invention.

It will be apparent to those skilled in the art that, in addition to its use as a method for the purification and reclamation of contaminated materials, the process of this invention may also be used as a step in the production of materials of high purity and its use in this respect is contemplated. For example, in the production of high polymers by any process small amounts of impurities remain in the polymer, which impurities tend to degrade the polymer, as described hereinbefore. While the polymer is subjected to several purification steps after its preparation, trace quantities may still remain finely dispersed through the polymer. The process of this invention would obviously remove these impurities thereby providing a product of exceptionally high purity and thermal stability.

Illustrative of the polymerization techniques to which the process of this invention will be particularly adaptable are the bomb or mass-bulk type, the monomer-polymer slurry type and the aqueous suspension type. In the bomb type of operation, polymerization, for example of chlorotrifluoroethylene, is effected in a steel or iron bomb type reactor under suitable conditions with or without the presence of a suitable promoter material, such as a halogenated acyl peroxide, for example trichloroacetyl peroxide. The promoter is dissolved in a solvent such as trifluorochloromethane, and the resulting solution is introduced into the reaction chamber, wherein the monomer, which is also introduced into the reaction chamber, comes in intimate contact with the promoter. For the production of normally plastic polymers temperatures between about −20° C. and about 50° C., preferably between about −10° C. and about 25° C. and pressures up to that at which decomposition becomes appreciable may be employed. At higher pressures higher temperatures may be employed, which decrease the polymerization time. The polymer is removed from the metal reactor in the form of a porous plug and treated, as by heating to remove solvent and unpolymerized monomer. As discussed above the outer portions of this porous plug are usually contaminated with the metallic derivatives of the bomb wall which portions are successfully reclaimed by the process of this invention. Since the polymer formed near the bomb wall during the polymerization tends to insulate the interior portion of the polymerization zone said interior portion is generally polymerized at other than the desired temperature and is in some instances of lower molecular weight. These outer portions of the plug which, due to their higher molecular weight, are more valuable and can now be recovered.

The monomer-polymer slurry type of polymerization employs substantially similar conditions and promoters as described above except that a different form of polymerization chamber and different manipulative steps are employed. The polymerization chamber may comprise a horizontal cylindrical chamber constructed of steel, iron or other metal. The monomer-polymer slurry in the chamber is maintained in a state of agitation by use of conventional stirrers. The chamber is maintained at a temperature as above and at its total pressure of the reaction mixture. A monomer-polymer slurry containing less than about 12% polymer, preferably about 5 to 7% polymer, is withdrawn from the exit end of the horizontal chamber and passed into a spray dryer. The outlet of the spray dryer is maintained at about 65° C. Vaporized monomer and suspended finely divided solid polymer are passed from the spray dryer to a cyclone separator in which solid polymer is separated from vaporized monomer.

The process of this invention is also particularly adaptable to the aqueous-suspension type process for reasons which will be made apparent below. In this process, the monomer is admixed with the aqueous-suspension medium in a polymerization zone which is maintained at the approximate conditions for polymerization and under sufficient pressure to maintain the aqueous solution and the monomer as a liquid. Under the preferred conditions of polymerization, the monomer and water are agitated by conventional means in the reaction zone, so as to intimately disperse the monomer in the aqueous-suspension medium. The monomer and polymer are substantially insoluble in the aqueous-suspension medium. Separation of the polymer from the water phase may be effected by settling and decantation, by filtering, by centrifuging, by evaporation or by other conventional methods.

The aqueous phase type of polymerization usually requires a suitable promoter agent for effecting the polymerization of the monomer in a reasonable length of time and also to produce a polymer of the desired molecular weight. These promoting agents fall into three general classes; promoters, activators and accelerators. In almost all instances a promoter must be used. Such promoters comprise the inorganic peroxides, such as, the perborates, persulfates, perphosphates, percarbonates, barium and hydrogen peroxide. Of particular value are the water soluble salts of the peracids, such as, sodium, potassium, calcium, barium, and ammonium salts of the persulfuric and perphosphoric acids. Suitable promoter concentration lies between about 0.003 molar and about 0.1 molar.

Promoters are usually used in conjunction with an activator such as sodium bisulfate, sodium hydrosulfate, sodium bisulfite and trimethyl amine, or in general any water soluble reducing agent. These activators are generally employed in concentrations similar to the concentration of the promoter employed. Equal molar amounts of promoter and activator are preferred.

Buffering agents may also be employed to obtain the optimum pH conditions. For example, when an alkaline pH is desired, buffers such as, borax, disodium phosphate, sodium carbonate, ammonium carbonate, and sodium acetate may be used, for an acid pH, acetic acid, propionic acid and monosodium phosphate may be employed. A pH range between 1 and about 4 is preferred.

Since the use of accelerators substantially increases the yield of polymer, and decreases the time of polymerization, they are usually employed. Generally accelerators are ionizable, inorganic, water soluble salts, and when in the oxidized state are more readily reduced than the promoter and in the reduced state are more readily oxidized than the activator. The salts of the heavy metals such as iron, manganese, and chromium are preferred; other accelerator elements comprise cobalt, silver, copper, nickel, molybdenum, and iodine. The accelerator element is introduced into the agitated reaction mixture in the form of the water soluble salt, preferably as the low valence form of the accelerating element, and after introduction and dissolution therein the salts ionize. Various salts of the accelerating element comprise the hydroxides, carbonates, sulfates, phosphates, nitrates, and chlorides. In the polymerization of trifluorochloro-ethylene, in a potassium persulfate-sodium bisulfite aqueous system, an iron sulfate is admixed with the reaction mixture in an amount sufficient to maintain the concentration of the accelerating element between about 10 and about 100 p. p. m. during the polymerization.

Polymer produced by this process will, because of the wide variety of compound employed to effect polymerization, be particularly subject to contamination. In addition, corrosion products are also present to a greater extend than in other processes. Complete removal of trace contaminants is effected by the process of this invention.

Having described our invention, we claim:

1. A process for removing contaminants selected from the group consisting of metallic contaminants and oxidizable organic contaminants from a polymer which contains carbon and fluorine and in which any other element is selected from the group consisting of chlorine and hydrogen which comprises contacting said contaminants and said polymer with a water-soluble carboxylic acid having not less than 2 and not more than 10 carbon atoms and containing a minor proportion of water and a water-soluble inorganic metallic oxidizing reagent comprising a compound of a metal in its highest valence state which is reducible to a compound of said metal in a low valence state and recovering said polymer substantially free of said contaminants as a product of the progress.

2. A process for removing contaminants selected from the group consisting of metallic contaminants and oxidizable organic contaminants from a polymer which contains carbon and fluorine and in which any other element is selected from the group consisting of chlorine and hydrogen which comprises contacting said contaminants and said polymer with a mixture comprising a water-soluble aliphatic carboxylic acid having not less than 2 and not more than 5 carbon atoms and containing a minor proportion of water and a water-soluble inorganic metallic oxidizing reagent comprising a compound of a heavy metal in its highest valence state which is reducible to a compound of said metal in a lower valence state and recovering said polymer substantially free of said contaminants as a product of the process.

3. The process of claim 2 wherein the aliphatic carboxylic acid is trichloroacetic acid.

4. The process of claim 2 wherein the aliphatic carboxylic acid is acetic acid.

5. The process of claim 2 wherein the water-soluble inorganic metallic oxidizing reagent is chromium trioxide.

6. The process of claim 2 wherein the water-soluble inorganic metallic oxidizing reagent is potassium dichromate.

7. A process for removing contaminants selected from the group consisting of metallic contaminants and oxidizable organic contaminants from a polymer which contains carbon and fluorine and in which any other element is selected from the group consisting of chlorine and hydrogen which comprises contacting said contaminants and said polymer with a mixture comprising a water-soluble aliphatic carboxylic acid having not less than 2 and not more than 5 carbon atoms and containing a minor proportion of water and a water-soluble inorganic metallic oxidizing reagent comprising a compound of a metal in its highest valence state which is reduced to a compound of said metal in a lower valence state after contact with said contaminants of said polymer and a secondary water-soluble oxidizing reagent which is characterized by its having a sufficiently high oxidizing potential to maintain the aforementioned water-soluble inorganic metallic oxidizing reagent in its highest valence state and recovering said polymer substantially free of said contaminants as a product of the process.

8. The process of claim 7 wherein the secondary water-soluble oxidizing reagent is potassium chlorate.

9. A process for removing contaminants selected from the group consisting of metallic contaminants and oxidizable organic contaminants from a polymer which contains carbon and fluorine and in which any other element is selected from the group consisting of chlorine and hydrogen which comprises contacting said contaminants and said polymer with a mixture comprising a water-soluble aliphatic carboxylic acid having not less than 2 and not more than 5 carbon atoms and containing a minor proportion of water and a water-soluble inorganic metallic oxidizing reagent comprising a compound of a metal in its highest valence state which is reduced to a compound of said metal in a lower valence state after contact with said contaminants of said polymer, whereby said contaminants are removed from said polymer, maintaining the resulting mixture in contact with said contaminants and said polymer at a temperature between room temperature and the boiling point of said mixture for a period of time between about 1 and about 24 hours and recovering said polymer substantially free of said contaminants as a product of the process.

10. A process for removing contaminants selected from the group consisting of metallic contaminants and oxidizable organic contaminants from a polymer which contains carbon and fluorine and in which any other element is selected from the group consisting of chlorine and hydrogen which comprises contacting said contaminants and said polymer with a mixture comprising a water-soluble aliphatic carboxylic acid having not less than 2 and not more than 5 carbon atoms and containing a minor proportion of water and a water-soluble inorganic metallic oxidizing reagent comprising a compound of a metal in its highest valence state which is reduced to a compound of said metal in a lower valence state after contact with said contaminants of said polymer, whereby said contaminants are removed from said polymer, maintaining the resulting mixture in contact with said contaminants and said polymer at a temperature above the boiling point of said mixture by operating at super-atmospheric pressure for a period of time between about 1 and about 24 hours and recovering said polymer substantially free of said contaminants as a product of the process.

11. A process for removing contaminants selected from the group consisting of metallic contaminants and oxidizable organic contaminants from a solid polymer of chlorotrifluoroethylene which comprises contacting said contaminants and said polymer while in a finely-divided form, said polymer and said contaminants having a particle size between about 40 and about 150 mesh, with between about 3 and about 7 times said polymers weight of a mixture comprising acetic acid, water in an amount between about .015 and about .3 mole for each mole of acetic acid and chromium trioxide ($CrO_3$) in an amount between about .003 and .03 mole for each mole of acetic acid, maintaining said mixture in contact with said polymer and said contaminants at a temperature between room temperature and the boiling point of said mixture for a period of time between about 1 and about 24 hours and recovering said polymer substantially free of said contaminants as a product of the process.

12. A process for removing contaminants selected from the group consisting of metallic contaminants and oxidizable organic contaminants from a solid polymer of chlorotrifluoroethylene which comprises admixing said contaminants and said polymer while in a finely-divided form having a particle size between about 40 and about 150 mesh, with between about 3 and about 7 times said polymers weight of a mixture comprising acetic acid, water in an amount between about .015 and about .3 mole for each mole of acetic acid, chromium trioxide in an amount between about .0003 and about .001 mole for each mole of acetic acid, and potassium chlorate in an amount between about .01 and about .04 mole for each mole of acetic acid, maintaining the resulting admixture at a temperature between room temperature and its boiling point for a period of time between about 1 and about 24 hours and recovering said polymer substantially free of said contaminants as a product of the process.

13. The process of claim 12 wherein the recovered polymer is subjected to a plurality of washings with hot methyl alcohol with subsequent filtrations until test of the wash liquid for presence of chromate ion is negative and finally dried by heating at elevated temperatures.

14. The process of claim 12 wherein the recovered polymer is subjected to a plurality of washings and boilings with a solution comprising acetic and hydrochloric acids with subsequent filtrations, a plurality of washings and boilings with methyl alcohol with subsequent filtrations and finally dried by heating at elevated temperatures.

15. The process of claim 14 wherein the recovered polymer is additionally subjected to a plurality of washings and boilings with water prior to washing with acetic acid.

16. A process for removing contaminants selected from the group consisting of metallic contaminants and oxidizable organic contaminants from a solid polymer of tetrafluoroethylene which comprises contacting said contaminants and said polymer with between about 3 and about 7 times said polymers weight of an oxidizing mixture comprising an alkyl monocarboxylic acid containing a minor proportion of water and chromium trioxide ($CrO_3$) in an amount between about .003 and .03 mole for each mole of said acid, at a temperature between room temperature and the boiling point of said mixture for a period of time between about 1 and about 24 hours and recovering said polymer substantially free of said contaminants as a product of the process.

17. A process for removing contaminants selected from the group consisting of metallic contaminants and oxidizable organic contaminants from a solid polymer of perfluorobutadiene which comprises contacting said contaminants and said polymer with between about 3 and about 7 times said polymers weight of an oxidizing mixture comprising an alkyl monocarboxylic acid containing a minor proportion of water and chromium trioxide ($CrO_3$) in an amount between about .003 and .03 mole for each mole of said acid at a temperature between room temperature and the boiling point of said mixture for a period of time between about 1 and about 24 hours and recovering said polymer substantially free of said contaminants as a product of the process.

18. A process for removing contaminants selected from the group consisting of metallic contaminants and oxidizable organic contaminants from a solid polymer of vinylidene fluoride which comprises contacting said contaminants and said polymer with between about 3 and about 7 times said polymers weight of an oxidizing mixture comprising an alkyl monocarboxylic acid containing a minor proportion of water and chromium trioxide ($CrO_3$) in an amount between about .003 and .03 mole for each mole of said acid at a temperature between room temperature and the boiling point of said mixture for a period of time between about 1 and about 24 hours and recovering said polymer substantially free of said contaminants as a product of the process.

19. A process for removing contaminants selected from the group consisting of metallic contaminants and oxidizable organic contaminants from a solid polymer of trifluoroethylene which comprises contacting said contaminants and said polymer with between about 3 and about 7 times said polymers weight of an oxidizing mixture comprising an alkyl monocarboxylic acid containing a minor proportion of water and chromium trioxide ($CrO_3$) in an amount between about .003 and 0.03 mole for each mole of said acid at a temperature between room temperature and the boiling point of said mixture for a period of time between about 1 and about 24 hours and recovering said polymer substantially free of said contaminants as a product of the process.

20. A process for removing contaminants selected from the group consisting of metallic contaminants and oxidizable organic contaminants from a solid polymer of chlorotrifluoroethylene which comprises contacting said contaminants and said polymer with between about 3 and about 7 times said polymers weight of an oxidizing mixture comprising an alkyl monocarboxylic acid containing a minor proportion of water and chromium trioxide ($CrO_3$) in an amount between about .003 and .03 mole for each mole of said acid at a temperature between room temperature and the boiling point of said mixture for a period of time between about 1 and about 24 hours and recovering the polymer substantially free of said contaminants as a product of the process.

References Cited in the file of this patent

UNITED STATES PATENTS

| | | |
|---|---|---|
| 2,245,052 | Salz | June 10, 1941 |
| 2,576,980 | Treue | Dec. 4, 1951 |

OTHER REFERENCES

Ind. Eng. Chem., 38 pages 872, 874 (September 1946).